United States Patent
Briesch et al.

(10) Patent No.: US 10,519,816 B2
(45) Date of Patent: Dec. 31, 2019

(54) LOW LOAD TURNDOWN FOR COMBINED CYCLE POWER PLANTS

(71) Applicant: SIEMENS AKTIENGESELLSCHAFT, München (DE)

(72) Inventors: Michael S. Briesch, Orlando, FL (US); James Cooney, Oviedo, FL (US); Keith B. McLaurin, Orlando, FL (US); Ray L. Johnson, Chuluota, FL (US)

(73) Assignee: Siemens Aktiengesellschaft, München (DE)

( * ) Notice: Subject to any disclaimer, the term of this patent is extended or adjusted under 35 U.S.C. 154(b) by 306 days.

(21) Appl. No.: 15/518,437

(22) PCT Filed: Oct. 27, 2014

(86) PCT No.: PCT/US2014/062368
§ 371 (c)(1),
(2) Date: Apr. 11, 2017

(87) PCT Pub. No.: WO2016/068837
PCT Pub. Date: May 6, 2016

(65) Prior Publication Data
US 2017/0306805 A1    Oct. 26, 2017

(51) Int. Cl.
*F01K 23/10* (2006.01)
*F22B 1/08* (2006.01)

(52) U.S. Cl.
CPC ............... *F01K 23/10* (2013.01); *F22B 1/08* (2013.01)

(58) Field of Classification Search
CPC ........ F01K 23/10; F01K 23/08; F01K 23/106; F01K 23/108; F01K 21/047; F22B 1/08; Y02E 20/16
See application file for complete search history.

(56) References Cited

U.S. PATENT DOCUMENTS

| | | |
|---|---|---|
| 4,047,005 A | 9/1977 | Heiser et al. |
| 4,437,313 A | 3/1984 | Taber et al. |
| 4,875,436 A * | 10/1989 | Smith ................ B01D 53/8631 122/7 R |

(Continued)

FOREIGN PATENT DOCUMENTS

| | | |
|---|---|---|
| DE | 19918347 A1 | 10/2000 |
| JP | H03282102 A | 12/1991 |

(Continued)

OTHER PUBLICATIONS

PCT International Search Report and Written Opinion of International Searching Authority dated Jun. 29, 2015 corresponding to PCT International Application No. PCT/US2014/062368 filed Oct. 27, 2014.

*Primary Examiner* — Steven M Sutherland
*Assistant Examiner* — Rodolphe Andre Chabreyrie

(57) ABSTRACT

A combined cycle power unit (10) including a gas turbine (16), a heat recovery steam generator (HRSG) (34) to generate steam from an exhaust flow (24) of the gas turbine (16), and a steam turbine (64) driven by the steam generated from the HRSG (34). Steam generated in an evaporator (50) in the HRSG (34) is conveyed through an upstream superheater stage (46*a*) and a downstream superheater stage (46*b*) in the HRSG (34). The steam is then conveyed from the downstream superheater stage (46*b*) to the steam turbine (64). Between the upstream and downstream superheater stages (46*a*, 46*b*), the steam flow from the upstream superheater stage (46*a*) is throttled to a lower pressure to form a reduced pressure steam flow prior to entering the downstream superheater stage (46*b*) where the steam is reheated to an elevated temperature at the reduced pressure.

15 Claims, 1 Drawing Sheet

(56) References Cited

U.S. PATENT DOCUMENTS

| | | | |
|---|---|---|---|
| 5,428,950 A * | 7/1995 | Tomlinson | F01K 23/106 60/39.182 |
| 5,435,138 A | 7/1995 | Silvestri, Jr. | |
| 5,564,269 A | 10/1996 | Briesch | |
| 6,062,017 A | 5/2000 | Liebig | |
| 6,125,623 A | 10/2000 | Cloyd et al. | |
| 6,178,734 B1 | 1/2001 | Shibuya et al. | |
| 6,266,953 B1 | 7/2001 | Ramstetter et al. | |
| 6,339,926 B1 * | 1/2002 | Ichiro | F01K 23/108 60/39.182 |
| 6,578,352 B2 | 6/2003 | Morikawa et al. | |
| 6,588,198 B2 | 7/2003 | Stats | |
| 6,829,898 B2 | 12/2004 | Sugishita | |
| 6,851,266 B2 | 2/2005 | Liebig | |
| 7,036,317 B2 | 5/2006 | Tanaka et al. | |
| 7,168,233 B1 * | 1/2007 | Smith | F01K 23/106 60/39.182 |
| 8,495,858 B2 | 7/2013 | Feller et al. | |
| 8,726,625 B2 | 5/2014 | Holt et al. | |
| 2005/0034445 A1 * | 2/2005 | Radovich | F01K 13/02 60/39.182 |
| 2007/0130952 A1 | 6/2007 | Copen | |
| 2012/0144839 A1 * | 6/2012 | Ehrsam | F01D 19/02 60/778 |
| 2012/0260668 A1 | 10/2012 | Rogers et al. | |
| 2012/0272649 A1 | 11/2012 | Berndt et al. | |
| 2014/0096535 A1 * | 4/2014 | Esakki | F01K 13/02 60/783 |

FOREIGN PATENT DOCUMENTS

| | | |
|---|---|---|
| JP | H05248604 A | 9/1993 |
| JP | 2003329201 A | 11/2003 |
| JP | 2010084765 A | 4/2010 |
| KR | 100313823 | 10/2001 |
| KR | 100313823 B | 1/2002 |

* cited by examiner

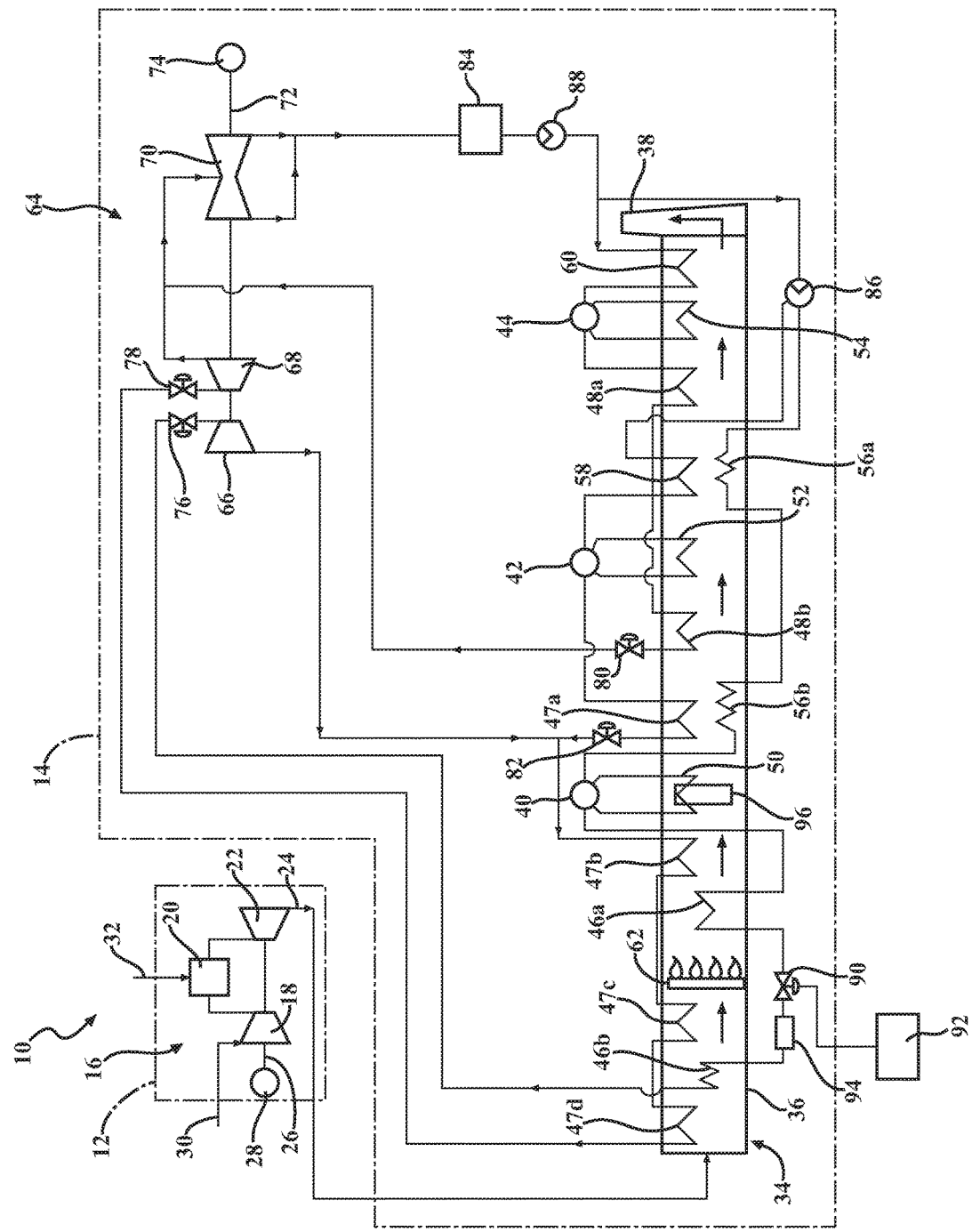

LOW LOAD TURNDOWN FOR COMBINED CYCLE POWER PLANTS

FIELD OF THE INVENTION

The present invention relates to combined cycle power plants and, more particularly, to operation of a heat recovery steam generator of a combined cycle power plant during a low load (electrical generation) mode of operation.

BACKGROUND OF THE INVENTION

In a combined cycle power plant, a gas turbine engine generates power from combustion of a fuel and air mixture. A heat recovery steam generator (HRSG) can be located downstream from the gas turbine engine to receive heat energy from the gas turbine engine exhaust to produce steam. The produced steam can be used to drive a steam turbine for generating additional power. In particular, the HRSG is a heat exchange device that uses the hot exhaust gas from the gas turbine engine to generate steam which is expanded in a steam turbine to produce a power output, such as to generate electricity utilizing an electrical generator. The HRSG can comprise a plurality of sections such as a low pressure (LP) section, an intermediate pressure (IP) section, and a high pressure (HP) section. Each section may include an evaporator, or heat exchanger, where water is converted to steam. The steam exiting the evaporators can pass through additional heat exchangers in the exhaust path within the HRSG, called superheaters, where the temperature and quality of steam within the superheaters is increased. Some HRSGs may include supplemental burners in the exhaust path to provide additional heat to increase the output of the steam turbine during peak demand conditions.

SUMMARY OF THE INVENTION

In accordance with an aspect of the invention, a method of operating a heat recovery steam generator for a combined cycle power unit is provided for the combined cycle power unit including a gas turbine a heat recovery steam generator (HRSG) to generate steam by recovering thermal energy of exhaust gas from the gas turbine, and a steam turbine driven by the steam generated from the HRSG. The method includes: generating saturated steam in an evaporator in the HRSG; conveying steam from the evaporator through an upstream superheater stage in the HRSG; conveying superheated steam from the upstream superheater stage through a downstream superheater stage in the HRSG; conveying the superheated steam from the downstream superheater stage to a steam turbine; and between the upstream and downstream superheater stages, throttling the steam flow from the upstream superheater stage to a lower pressure to form a reduced pressure steam flow prior to entering the downstream superheater stage.

The throttled reduced pressure steam flow entering the downstream superheater stage can be superheated steam.

The power plant has a base load mode of operation and a low load mode of operation and wherein: operation of the power plant in the base load of operation can include providing an unthrottled steam flow from the upstream superheater stage to the downstream superheater stage; and operation of the power plant in the low load mode of operation can include throttling the steam flow from the upstream superheater stage to the downstream superheater stage.

During the base load mode of operation, a temperature of the steam provided to the steam turbine can be at a base load operating temperature; and during the low load mode of operation, the steam provided to the steam turbine can be at a reduced pressure and is at the base load operating temperature and maintains the steam turbine at the base load operating temperature.

A predetermined pressure can be maintained in the evaporator, with an associated saturation temperature for the steam in the evaporator at or above a predetermined minimum temperature during the low load mode of operation.

A selective catalytic reduction (SCR) system can be located within the HRSG adjacent to the evaporator, and the predetermined minimum temperature is within an operable temperature range of the SCR to maintain the SCR operable during a reduction of exhaust gas temperatures in the low load mode of operation.

The steam turbine can include a high pressure turbine section and an intermediate pressure turbine section, and the evaporator can be a high pressure evaporator providing steam to the upstream superheater stage for supplying steam to the high pressure turbine section, and including an intermediate pressure evaporator and at least one intermediate superheater stage receiving steam from the intermediate pressure evaporator and providing superheated steam to the intermediate pressure turbine section.

In accordance with another aspect of the invention, a method of operating a heat recovery steam generator for a combined cycle power unit is provided for the combined cycle power unit including a gas turbine, a heat recovery steam generator (HRSG) to generate steam by recovering thermal energy of exhaust gas from the gas turbine, and a steam turbine driven by the steam generated from the HRSG, the method including: operating the power plant in a base load mode of operation wherein superheated steam is provided from the HRSG to the steam turbine at a base load operating temperature and at a base load operating pressure; and subsequently, operating the power plant in a low load mode of operation wherein superheated steam is provided from the HRSG to the steam turbine at the base load operating temperature and at a reduced operating pressure that is less than the base load operating pressure.

The HRSG can receive exhaust flow from the gas turbine at a reduced temperature during the low load mode of operation in comparison to the temperature of exhaust flow provided to the HRSG during the base load mode of operation.

The HRSG can include at least an upstream superheater stage and a downstream superheater stage that supply the superheated steam to the steam turbine, and including throttling a steam flow from the upstream superheater stage to the downstream superheater stage during the low load mode of operation.

The downstream superheater stage can provide superheated steam to a high pressure turbine, and the upstream and downstream superheaters form primary and secondary superheaters, respectively, in the HRSG.

Subsequent to operation in the low load mode of operation, the steam turbine can return to the base load mode of operation and wherein the superheated steam provided to the steam turbine can be maintained at the base load operating temperature throughout the low load mode of operation.

A power output of the steam turbine can be ramped up from the low load to the base load mode of operation at a rate based on available steam pressure from the HRSG, without reference to the temperature of the steam turbine.

In accordance with a further aspect of the invention, a combined cycle power plant is provided comprising a gas turbine operable to generate power and producing an exhaust output; a heat recovery steam turbine (HRSG) receiving the exhaust output from the gas turbine and producing superheated steam; and a steam turbine receiving superheated steam from the HRSG to generate power. The HRSG includes: an evaporator providing a source of saturated steam; an upstream superheater stage connected to an output from the evaporator for receiving steam from the evaporator; a downstream superheater for receiving steam from the upstream superheater via a steam conduit; and a throttling valve located in the steam conduit, the throttling valve throttling steam flow to a lower pressure and temperature between the upstream and downstream superheaters during a low load mode of operation of the power plant, and the downstream superheater reheating the steam flow prior to providing the reheated steam to the steam turbine.

All of the steam flow entering the throttling valve from the upstream superheater stage can flow through the throttling valve to the downstream superheater stage.

The steam turbine can include a high pressure turbine section and an intermediate pressure turbine section, and the evaporator is a high pressure evaporator providing steam to the upstream superheater stage for supplying steam to the high pressure turbine section, and including an intermediate pressure evaporator and at least one intermediate superheater stage receiving steam from the intermediate pressure evaporator and providing superheated steam to the intermediate pressure turbine section.

A selective catalytic reduction (SCR) system can be located within the HRSG adjacent to the high pressure evaporator, and the high pressure evaporator is maintained at a temperature that is within an operable temperature range of the SCR to maintain the SCR operable during a reduction of exhaust gas temperatures in the low load mode of operation.

An attemperator can be located downstream of the throttling valve.

A control unit can be provided having a processor and connected to the throttling valve for controlling a variation of steam flow through the throttling valve between the base load mode of operation and the low load mode of operation.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing FIGURE, in which like reference numerals identify like elements, and wherein:

FIG. 1 is a schematic diagram of a combined cycle power plant incorporating aspects of the present invention.

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Power plants are subjected to widely varying demand loads from the electric power grid. They must respond to these loads while maintaining efficiency and taking into account thermal effects on the service life of components forming the power plant. For example, changing demand loads and resulting changes in temperature of gas and steam turbine engines can result in interference between the stationary and rotating components within the engines unless measures are implemented to control component temperatures and associated clearances during load transitions, such as may be required during transitions from low or part load to full or base load. In accordance with an aspect of the present invention, a method and associated apparatus is described for operating a combined cycle power plant at minimum output levels, i.e., during a low load turndown operation, making it financially attractive to maintain the unit generators of the power plant coupled to the electrical power grid during low demand conditions. In accordance with particular aspects of the invention, the low load turndown method can maintain unit availability to ramp power to base load output in a minimized or reduced time, while extending the service life of turbine components susceptible to thermal cycling stress induced fatigue. As described in further detail below, a bottoming cycle comprising a steam turbine can be maintained online during low load operation of a power plant at a reduced steam pressure, but at a steam temperature maintained at an elevated level that is substantially the same as an operating temperature of steam provided to the steam turbine during operation at base load output. The described operation addresses existing problems of combined cycle plants associated with both exhaust gas emission regulation and component thermal cycling fatigue.

FIG. 1 is a schematic diagram of a combined cycle power plant 10 including a topping cycle 12 and bottoming cycle 14. The topping cycle 12 comprises a gas turbine engine 16 including a compressor section 18, a combustor section 20, a turbine section 22, an exhaust flow 24 from the turbine section 22, and a power output shaft 26 that drives a first generator 28. A supply of air 30 enters the compressor section 18 and is compressed and provided to the combustor section 20, and a fuel flow 32 is provided to the combustor section 20 where it is mixed with the compressed air to form a hot working gas. The hot working gas is expanded in the turbine section 22 to provide a power output through the power output shaft 26, and produce the exhaust flow 24.

The bottoming cycle 14 comprises a heat recovery steam generator (HRSG) for producing steam, and a steam turbine 64 driven by the steam produced in the HRSG 34. The HRSG 34 comprises a gas duct 36 for guiding the exhaust flow 24 across heat exchanger surfaces (e.g., superheaters, evaporators and economizers) within the HRSG 34 and the exhaust flow can eventually exit the plant 10 via an exhaust stack 38. The HRSG 34 can comprise, for example, a three-pressure system of high, intermediate and low pressure heat transfer sections, and can include a high pressure drum 40, and intermediate pressure drum 42 and a low pressure drum 44 for the respective different pressure sections.

The high pressure heat transfer section can comprise high pressure superheaters including an upstream high pressure superheater 46a, i.e., an upstream superheater stage, and a downstream high pressure superheater 46b, i.e., a downstream superheater stage. The upstream superheater 46a may be a primary superheater and the downstream superheater 46b may be a secondary superheater. The intermediate pressure heat transfer section can comprise at least one intermediate pressure superheater, i.e., an intermediate pressure superheater stage, and is depicted herein as including first, second, third and fourth intermediate pressure superheaters 47a, 47b, 47c and 47d. The low pressure heat transfer section can comprise first and second low pressure superheaters 48a, 48b.

The high, intermediate and low pressure heat transfer sections also each include evaporators and economizers. In particular, the high, intermediate and low pressure sections include evaporators 50, 52, 54 connected to respective pressure drums 40, 42, 44. The high pressure section includes an economizer having first and second economizer sections 56a, 56b, the intermediate pressure section includes an economizer 58, and the low pressure section includes an economizer 60.

It may be understood that the economizers 56a, 56b, 58 and 60 are generally arranged in a downstream direction of the exhaust flow 24 and provide a heated water supply to the respective pressure drums 40, 42, 44 at a temperature below the saturation temperature associated with each of the respective drums 40, 42, 44. The high, intermediate and low pressure drums 40, 42, 44 are operated at different respective pressures and the evaporators 50, 52, 54 maintain a saturated steam temperature corresponding to the pressure at each of the drums 40, 42, 44. In addition, the HRSG 34 can include a duct burner 62 located between the upstream and downstream high pressure superheaters 44a, 44b and can be operated as a supplementary heat source within the HRSG 34. Further, although particular components are described herein for the HRSG 34, it may be understood that the HRSG 34 can be provided in a variety of configurations, such as a two-pressure system or other configuration, and that the present invention can be operable with any HRSG 34 having at least an upstream (primary) high pressure superheater stage and a downstream (secondary) high pressure superheater stage.

The steam turbine 64 of the bottoming cycle 14 is illustrated as comprising a high pressure turbine section 66, an intermediate pressure turbine section 68 and a low pressure turbine section 70. The steam turbine 64 includes a power output shaft 72 that can drive a second generator 74 to provide an additional electrical power output for the power plant 10.

Various valves can be provided for controlling flow of steam from the HRSG 34 to the steam turbine 64, as is known in the art. For example, the high pressure section can include a valve 76 controlling steam flow from the downstream high pressure superheater 46b to the high pressure turbine section 66; the intermediate pressure section can include a valve 78 controlling steam flow from the fourth intermediate pressure superheater 47d to the intermediate pressure turbine section 68; and the low pressure section can include a valve 80 controlling steam flow from the second low pressure superheater 48b into the low pressure turbine section 70. The intermediate pressure section can also include an additional valve 82 that facilitates maintaining a minimum pressure in the intermediate pressure drum 42 to ensure the steam exiting the intermediate pressure drum 42 is maintained within acceptable operating velocity limits.

Expanded steam from the steam turbine 64 can be condensed in a condenser 84 and returned to the HRSG 34. The return of water from the condenser 84 to the HRSG 34 can be performed in a conventional manner, including providing pumps 86, 88 that drive the water from the condenser 84 through the economizers 56a, 56b, 58, 60, to the respective pressure drums 40, 42, 44.

During base load operation, such as can be required by a high demand from the power grid, the exhaust flow 24 is at a maximum temperature, providing a high power output from the bottoming cycle 14, and the valves 76, 78, 80 may be positioned fully open to provide a maximum steam flow to the steam turbine sections 66, 68, 70, or may be adjusted as necessary to control the output of the steam turbine 64. Further, in a conventional or known operation of a bottoming cycle, the valves 76, 78, 80 can be moved to a partially closed position to provide a reduced or throttled steam flow for a reduced output from the second generator 74. While the throttled steam flow in the conventional operation has enabled the bottoming cycle 14 to remain online during minimum power requirements, running in a low load turndown (LLTD) mode of operation, the throttled steam enters the steam turbine sections 66, 68, 70 at a lower temperature than is provided during base load operation. In particular, the conventional low load turndown operation results in a large drop in temperature of the high pressure steam provided to the high pressure turbine section 66. Problems associated with the change in high pressure steam temperature include thermal cycling stress of the turbine section 66, and a requirement that a change from low load to base load operation be ramped up at a relatively slow rate to ensure that thermal expansion of the stationary and rotating components in the turbine section 66 is matched to avoid interference contact of the components.

In accordance with an aspect of the invention, the high pressure section of the HRSG 34 is provided with a high pressure throttling valve 90 located between the upstream and downstream high pressure superheaters 46a and 46b. The high pressure throttling valve 90 can operate between an unthrottled (fully open) position and a throttled (partially closed) position, wherein the throttled position may comprise any of a plurality of continuously variable positions providing a restricted flow of steam downstream of the upstream high pressure superheater 46a. The opening/closing of the throttling valve 90 can be operated under control of a controller or control unit 92 that may comprise, for example, a processing unit and a memory. The memory may be embodied as a non-transitory computer or machine readable medium having executable instructions stored thereon. When executed, these executable instructions can instruct the processing unit to open and close the throttling valve 90 in accordance with predefined algorithms. The control unit 92 may comprise a controller for other operations, including for controlling other valves and for controlling operation of the plant 10.

In addition, the high pressure section of the HRSG 34 can be provided with an attemperator 94. The attemperator 94 is shown located between the throttling valve 90 and the downstream high pressure superheater 46b, and can be operated to reduce the temperature of the steam as necessary to control the final steam temperature supplied to the high pressure turbine section 66.

In accordance with a particular aspect of the invention, the high pressure steam flowing though the throttling valve 90 subsequently passes through at least one high pressure superheater prior to being conveyed to the high pressure turbine section 66, as is depicted by flow through the downstream high pressure superheater 46b. That is, all of the steam flow from the upstream high pressure superheater 46a preferably passes through the throttling valve 90 and flows to the downstream superheater 46b. The high pressure superheater 46b downstream of the throttling valve 90 operates to increase the temperature of the throttled steam, and can increase the high pressure steam temperature to at least the temperature of the high pressure steam provided to the high pressure steam turbine section 66 during base load operation, preferably enabling operation of the high pressure section at constant temperature regardless of changes in operating load and exhaust flow temperature. In a LLTD operation, the high pressure steam can be throttled to a reduced pressure with a decreased temperature at the throttling valve 90; however, due to passage of the steam through the downstream superheater 46*b*, the reduced pressure steam can be provided to the high pressure turbine section 66 at an elevated temperature that is equal to the temperature of the high pressure steam provided to the high pressure turbine section 66 during base load operation. Additionally, it should be understood that the valve 76 for the high pressure turbine section 66 is preferably in a fully open position during the LLTD operation, such that all throttling of steam from the high pressure section of the HRSG 34 can occur at the throttling valve 90 during LLTD operation. Hence, the high pressure steam turbine 66 can be provided with a low pressure steam flow to operate at a low output during turndown while also maintaining the turbine components at a temperature equivalent to the base load operating temperature, i.e., the components are maintained at a constant temperature.

By placing the throttling valve 90 downstream of the upstream superheater 46*a*, the temperature of the superheated steam is elevated prior to throttling in the valve 90 to avoid the temperature of the throttled steam dropping below the saturation temperature and potential formation of water drops in the downstream superheater 46*b*.

Further, operation of the throttling valve 90 in the high pressure superheater section can operate to maintain the pressure in the high pressure drum 40 at a constant pressure as steam flow decreases during turndown such that, during LLTD operation when the temperature of the exhaust flow 24 may be decreased, throttling of the high pressure steam avoids a decrease in the saturation temperature within the high pressure drum 40, and can maintain an elevated temperature of the high pressure section evaporator 50. A selective catalytic reduction (SCR) system 96 may be located adjacent to the high pressure evaporator 50, e.g., positioned within the tubes of the evaporator 50, and maintaining an elevated temperature of the evaporator 50 during LLTD operation can maintain the SCR within its effective operating temperature range. For example, a typical SCR may have an operating temperature range of about 500° F. to 850° F. within which it can operate at an optimum efficiency to reduce emissions, such as CO, such that operating the throttling valve 90 to maintain a constant elevated saturation temperature at the high pressure drum 40 during LLTD can maintain the evaporator 50 and adjacent SCR within the optimum effective temperature range for the SCR.

It should be noted that the present invention provides advantages when ramping up the power plant 10 from LLTD to base load operation. As a result of the throttling operation provided by the throttling valve 90 operating in combination with at least one downstream superheater 46*b*, the high pressure steam temperature, and thus the high pressure turbine section 66, is maintained at the elevated base load operating temperature, permitting the high pressure turbine section 66 to be ramped up to full or base load operation as quickly as steam pressure is available to drive the turbine 64 at base load. That is, it is not necessary to delay ramping up the steam turbine 64 to accommodate component clearance issues during the transition from LLTD to base load since the component temperatures are maintained at the base load level. Additionally, during LLTD operation and ramp up of the gas turbine 16 from LLTD to base load operation, CO emissions in the exhaust flow 24 are typically significantly higher, requiring efficient operation of the SCR to meet emission requirements. Operation of the throttling valve 90 to maintain the SCR temperature in its effective operating range facilitates meeting the emissions regulations for CO during the ramp up operation when exhaust flow temperatures may initially be insufficient to maximize operation of the SCR for reducing CO emissions.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of operating a heat recovery steam generator for a combined cycle power unit, the combined cycle power unit including a gas turbine, the heat recovery steam generator (HRSG) to generate steam by recovering thermal energy of exhaust gas from the gas turbine, and a steam turbine driven by the steam generated from the HRSG, the method including:

generating saturated steam in an evaporator in the HRSG;

conveying steam from the evaporator through an upstream superheater stage in the HRSG;

conveying superheated steam from the upstream superheater stage through a downstream superheater stage in the HRSG;

conveying the superheated steam from the downstream superheater stage to a steam turbine; and between the upstream and downstream superheater stages, throttling the steam flow from the upstream superheater stage to a lower pressure to form a reduced pressure steam flow prior to entering the downstream superheater stage, wherein the combined cycle power unit has a base load mode of operation and a low load mode of operation and wherein:

operation of the combined cycle power unit in the base load of operation includes providing an unthrottled steam flow from the upstream superheater stage to the downstream superheater stage; and operation of the combined cycle power unit in the low load mode of operation includes throttling the steam flow from the upstream superheater stage to the downstream superheater stage, wherein:

during the base load mode of operation, a temperature of the steam provided to the steam turbine is at a base load operating temperature; and during the low load mode of operation, the steam provided to the steam turbine is at a reduced pressure and is at the base load operating temperature and maintains the steam turbine at the base load operating temperature.

2. The method of claim 1, wherein the reduced pressure steam flow entering the downstream superheater stage is superheated steam.

3. The method of claim 1, including maintaining a predetermined pressure in the evaporator, with an associated saturation temperature for the steam in the evaporator at or above a predetermined minimum temperature during the low load mode of operation.

4. The method of claim 3, wherein a selective catalytic reduction (SCR) system is located within the HRSG adjacent to the evaporator, and the predetermined minimum temperature is within an operable temperature range of the SCR to maintain the SCR operable during a reduction of exhaust gas temperatures in the low load mode of operation.

5. The method of claim 1, wherein the steam turbine includes a high pressure turbine section and an intermediate pressure turbine section, and the evaporator is a high pressure evaporator providing steam to the upstream superheater stage for supplying steam to the high pressure turbine section, and including an intermediate pressure evaporator and at least one intermediate superheater stage receiving steam from the intermediate pressure evaporator and providing superheated steam to the intermediate pressure turbine section.

6. A method of operating a heat recovery steam generator for a combined cycle power unit, the combined cycle power unit including a gas turbine, the heat recovery steam generator (HRSG) to generate steam by recovering thermal energy of exhaust gas from the gas turbine, and a steam turbine driven by the steam generated from the HRSG, the method including:
operating the combined cycle power unit in a base load mode of operation wherein superheated steam is provided from the HRSG to the steam turbine at a base load operating temperature and at a base load operating pressure; and
subsequently, operating the combined cycle power unit in a low load mode of operation wherein superheated steam is provided from the EMS G to the steam turbine at the base load operating temperature and at a reduced operating pressure that is less than the base load operating pressure,
wherein the HRSG includes at least an upstream superheater stage and a downstream superheater stage that supply the superheated steam to the steam turbine, and including throttling a steam flow from the upstream superheater stage to the downstream superheater stage during the low load mode of operation.

7. The method of claim 6, wherein the HRSG receives exhaust flow from the gas turbine at a reduced temperature during the low load mode of operation in comparison to the temperature of exhaust flow provided to the HRSG during the base load mode of operation.

8. The method of claim 6, wherein the downstream superheater stage provides superheated steam to a high pressure turbine, and the upstream and downstream superheaters form primary and secondary superheaters, respectively, in the HRSG.

9. The method of claim 6, including, subsequent to operation in the low load mode of operation, returning the steam turbine to the base load mode of operation and wherein the superheated steam provided to the steam turbine is maintained at the base load operating temperature throughout the low load mode of operation.

10. The method of claim 9, wherein a power output of the steam turbine is ramped up from the low load to the base load mode of operation at a rate based on available steam pressure from the HRSG, without reference to the temperature of the steam turbine.

11. A combined cycle power plant comprising:
a gas turbine operable to generate power and producing an exhaust output;
a heat recovery steam generator (HRSG) receiving the exhaust output from the gas turbine and producing superheated steam; and
wherein the HRSG includes:
an evaporator providing a source of saturated steam;
an upstream superheater stage connected to an output from the evaporator for receiving steam from the evaporator;
a downstream superheater for receiving steam from the upstream superheater via a steam conduit; and
a throttling valve located in the steam conduit, the throttling valve controlling steam flow from the upstream superheater stage to the downstream superheater stage between a base mode of operation and a low load mode of operation of the combined cycle power plant:
a steam turbine receiving the superheated steam from the HRSG to generate power; and
a control unit operatively connected to the throttling valve, and configured to:
actuate the throttling valve to provide to the steam turbine, the superheated steam at a base load operating temperature and at a base load operating pressure during the base load mode of operation; and
actuate the throttling valve to provide to the steam turbine, the superheated steam at the base load operating temperature and at a reduced operating pressure that is less than the base load operating pressure during the low load mode of operation.

12. The combined cycle power plant of claim 11, wherein all of the steam flow entering the throttling valve from the upstream superheater stage flows through the throttling valve to the downstream superheater stage.

13. The combined cycle power plant of claim 11, wherein the steam turbine includes a high pressure turbine section and an intermediate pressure turbine section, and the evaporator is a high pressure evaporator providing steam to the upstream superheater stage for supplying steam to the high pressure turbine section, and including an intermediate pressure evaporator and at least one intermediate superheater stage receiving steam from the intermediate pressure evaporator and providing superheated steam to the intermediate pressure turbine section.

14. The combined cycle power plant of claim 13, including a selective catalytic reduction (SCR) system located within the HRSG adjacent to the high pressure evaporator, and the high pressure evaporator is maintained at a temperature that is within an operable temperature range of the SCR to maintain the SCR operable during a reduction of exhaust gas temperatures in the low load mode of operation.

15. The combined cycle power plant of claim 14, including an attemperator downstream of the throttling valve.

* * * * *